United States Patent
Deshpande et al.

(10) Patent No.: US 12,437,196 B2
(45) Date of Patent: Oct. 7, 2025

(54) METHOD AND SYSTEM FOR ESTIMATING URBAN METABOLISM

(71) Applicant: Tata Consultancy Services Limited, Mumbai (IN)

(72) Inventors: Shailesh Shankar Deshpande, Pune (IN); Chaman Banolia, New Delhi (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 629 days.

(21) Appl. No.: 17/970,975

(22) Filed: Oct. 21, 2022

(65) Prior Publication Data
US 2023/0196099 A1 Jun. 22, 2023

(30) Foreign Application Priority Data

Dec. 20, 2021 (IN) .............................. 202121059475

(51) Int. Cl.
*G06K 9/62* (2022.01)
*G06N 3/08* (2023.01)
(Continued)

(52) U.S. Cl.
CPC ................. *G06N 3/08* (2013.01); *G06T 5/80* (2024.01); *G06T 7/0002* (2013.01); *G06T 2207/10032* (2013.01); *G06T 2207/20081* (2013.01)

(58) Field of Classification Search
CPC ........... G06N 3/08; G06T 5/80; G06T 7/0002; G06T 2207/10032; G06T 2207/20081; G06Q 10/04; G06Q 10/067; G06Q 10/00
See application file for complete search history.

(56) References Cited

FOREIGN PATENT DOCUMENTS

| CN | 106683096 A | * | 5/2017 | ........... G06T 7/0004 |
| CN | 107798425 A | * | 3/2018 | ............. G06Q 10/04 |

(Continued)

OTHER PUBLICATIONS

Insigne et al., "Developing a neural network that uses satellite imagery to estimate carbon dioxide emissions in the Philippines," Publiscience, 4(1) (2021).

(Continued)

*Primary Examiner* — Xin Jia
(74) *Attorney, Agent, or Firm* — Finnegan, Henderson, Farabow, Garrett & Dunner, LLP

(57) ABSTRACT

The embodiments of present disclosure herein address problem of urban metabolism with respect to water demand and carbon dioxide emissions, the discussion is based on the reported data by the urban areas. The embodiments herein provide a method and system for estimating urban metabolism based on remotely sensed data. The system is configured to develop a model for identifying correct features from image or proxy features from image and then develop/use relation between the image feature or proxy feature from the image with the urban metabolic parameter. Further, the system develops an urban growth model which predicts spatial extent of the given proxy features. The urban growth scenario for each such conditions is different. By changing conditions of the model, different growth scenarios are played out. For each scenario, at least one urban metabolic parameter is predicted by taking output of the urban growth predictor.

7 Claims, 3 Drawing Sheets

(51) Int. Cl.
G06T 5/80 (2024.01)
G06T 7/00 (2017.01)

(56) References Cited

FOREIGN PATENT DOCUMENTS

| | | | | |
|---|---|---|---|---|
| CN | 109684929 A | * | 4/2019 | ....... G06F 18/24147 |
| CN | 112734694 A | | 4/2021 | |
| CN | 113298755 A | * | 8/2021 | ......... G06F 18/2135 |
| WO | WO 2016/125941 A1 | | 8/2016 | |

OTHER PUBLICATIONS

Tao et al., "Spatial allocation of anthropogenic carbon dioxide emission statistics data fusing multi-source data based on Bayesian network," Scientific Reports, 11:18128 (2021).

Yirsaw et al., "Land Use/Land Cover Change Modeling and the Prediction of Subsequent Changes in Ecosystem Service Values in a Coastal Area of China, the Su-Xi-Chang Region," Sustainability, 9(1204) (2017).

* cited by examiner

METHOD AND SYSTEM FOR ESTIMATING URBAN METABOLISM

CROSS-REFERENCE TO RELATED APPLICATIONS AND PRIORITY

This U.S. patent application claims priority under 35 U.S.C. § 119 to Indian Application number 202121059475, filed on Dec. 20, 2021. The entire contents of the aforementioned application are incorporated herein by reference.

TECHNICAL FIELD

The disclosure herein generally relates to the field of urban metabolism and more specifically, to a method and system for estimating urban metabolism based on remotely sensed data.

BACKGROUND OF THE INVENTION

In today's era, most of the world population wants to live in urban areas. Urban areas are the centers of socio-economic activities for large population and hence they are generally economic prime-overs of the state. While they provide socio-economic means of wellbeing, they consume large number and quantities of resources as well. The main natural resources are water, soil (minerals, green produce and so on), and air. All of them provide certain ecoservices to the urban population and may be within the municipal boundary of the urban or outside the boundary, for example, drinking water for the urban area or population may come from nearby water supply lake.

The urban population uses these resources for its activities, and it also produces waste materials like water effluents, solid waste, air pollutants and so on. Such emissions by cities are becoming a global issue, in addition to the local issues because of the pollution. Carbon dioxide emissions are leading cause of global warming and climate change. The effects of particulate matter on precipitation are not very well understood yet—particulate matter increase and decrease precipitation depending upon the conditions. Local effects include air pollution, water pollution, land degradation, heat island effect, urban floods and so on. Because of these adverse effects, cities are becoming unsustainable day by day.

In order to model the material inflows and outflows from the urban areas, focus is on estimating/predicting emissions by the urban area and further to model its impact on the urban surroundings. Most of existing state of the art explains the concept of urban metabolism with respect to water demand and carbon dioxide emissions, most of the discussions are based on the reported data by the urban areas. It is important to estimate urban metabolism, which is a model to facilitate the description and analysis of the flows of the materials and energy within cities, such as undertaken in a material flow analysis of a city. It provides researchers with a metaphorical framework to study the interactions of natural and human systems in specific regions.

SUMMARY OF THE INVENTION

Embodiments of the disclosure present technological improvements as solutions to one or more of the above-mentioned technical problems recognized by the inventors in conventional systems. For example, in one embodiment, a method and system for estimating urban metabolism based on remotely sensed data is provided.

In one aspect, a processor-implemented method for estimating urban metabolism based on remotely sensed data is provided. The method includes one or more steps such as receiving, via an input/output interface, remotely sensed data, and a predefined ecological dataset of a predefined urban area, wherein the remotely sensed data includes multispectral data, hyperspectral data, radar data, one or more Landsat-8 images and shapefiles of the predefined urban area. Further, filtering, via a one or more hardware processors, the received predefined ecological dataset based on null values and an emission availability to structure the ecological dataset into a predefined format of a mapping table, processing, via the one or more hardware processors, the structured ecological dataset based on one or more predefined automatic scripts, analyzing, via the one or more hardware processors, the received remotely sensed data according to shapefiles of the predefined urban area using a machine learning technique and one or more fractions of classes in each pixel of the remotely sensed data, classifying, via the one or more hardware processors, the one or more Landsat-8 images and shapefiles based on a support vector machine to obtain a dataset of vegetation, impervious surfaces, and soil, training, via the one or more hardware processors, a regression model using the pivoted dataset and the identified land cover, and determining, via the one or more hardware processors, one or more urban metabolic parameters using the trained regression model.

In another aspect, a system for estimating urban metabolism based on remotely sensed data is provided. The system includes an input/output interface configured to receive remotely sensed data and a predefined ecological dataset of a predefined urban area, wherein the remotely sensed data includes multispectral data, hyperspectral data, radar data, one or more Landsat-8 images and shapefiles of the predefined urban area, one or more hardware processors and at least one memory storing a plurality of instructions, wherein the one or more hardware processors are configured to execute the plurality of instructions stored in the at least one memory.

Further, the system is configured to filter the received predefined ecological dataset based on null values and an emission availability to structure the ecological dataset into a predefined format of a mapping table, process the structured ecological dataset based on one or more predefined automatic scripts, wherein the one or more predefined automatic scripts for querying questions and answers of interest from a survey, pivoting the structured ecological dataset, analyze the received remotely sensed data according to shapefiles of the predefined urban area using a machine learning technique and one or more fractions of classes in each pixel of the remotely sensed data, classify the one or more Landsat-8 images based on a support vector machine to obtain a dataset of vegetation, impervious surfaces, and soil, wherein a fully constrained least square technique is used for linear spectral unmixing of the remote sensing dataset to calculate the fractions of vegetation, impervious surfaces, and soil (VIS) in each pixel of the image, training a regression model using the pivoted dataset and the identified land cover and determine one or more urban metabolic parameters using the trained regression model, wherein the one or more urban metabolic parameters of present and future as per the simple temporal or spatial scenario include carbon emission of the predefined region.

In yet another aspect, one or more non-transitory machine-readable information storage mediums are provided comprising one or more instructions, which when executed by one or more hardware processors causes a method for estimating urban metabolism based on remotely sensed data is provided. The method includes one or more steps such as receiving, via an input/output interface, remotely sensed data, and a predefined ecological dataset of a predefined urban area, wherein the remotely sensed data includes multispectral data, hyperspectral data, radar data, one or more Landsat-8 images and shapefiles of the predefined urban area. Further, filtering, via a one or more hardware processors, the received predefined ecological dataset based on null values and an emission availability to structure the ecological dataset into a predefined format of a mapping table, processing, via the one or more hardware processors, the structured ecological dataset based on one or more predefined automatic scripts, analyzing, via the one or more hardware processors, the received remotely sensed data according to shapefiles of the predefined urban area using a machine learning technique and one or more fractions of classes in each pixel of the remotely sensed data, classifying, via the one or more hardware processors, the one or more Landsat-8 images and shapefiles based on a support vector machine and unmixing analysis to obtain a dataset of vegetation, impervious surfaces, and soil, and its fractions, and training, via the one or more hardware processors, a regression model using the pivoted dataset and the identified land cover, and determining, via the one or more hardware processors, one or more urban metabolic parameters using the trained regression model.

It is to be understood that the foregoing general descriptions and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a method and system for estimating urban metabolism based on remotely sensed data. It has been observed that cities disclosing ecological data through Carbon Disclosure Project (CDP) has several advantages, from improved engagement to centralizing data and tracking progress. The CDP data is a collection of responses to the questionnaire by the CDP, filled by urban/town administration or municipal corporations. The CDP evaluates your response, benchmarks the urban's performance against peers, and finds areas of opportunity for them. The CDP houses the world's largest, most comprehensive dataset on environmental action. As the data grows to include thousands more companies and cities each year, there is increasing the potential to utilize the data in impactful ways. So, the CDP launched its data to the Kaggle community for a challenge.

Herein, the system is configured to develop a model for identifying correct features from image or proxy features from image and then develop/use relation between the image feature or proxy feature from the image with the urban metabolic parameter. For example, a run-off model using impervious surfaces extracted using an urban object detector, radiant heat using basic land covers such as vegetation impervious surface soil (VIS). Further, the system develops an urban growth model which predicts spatial extent of the given proxy features. For example, take impervious surfaces spatial distribution and develop/use the model for its prediction in future urban growth predictor. Further, the system is configured to use the urban metabolic parameter predictor for predicting the urban metabolic parameters which takes output of models in urban growth predictor as an input. Output of the urban growth predictor is subjected to different conditions. The urban growth scenario for each such conditions is different. By changing conditions of the model, different growth scenarios are played out. For each such scenario, at least one urban metabolic parameter is predicted by taking output of the urban growth predictor for each scenario as an input.

Figure 1:
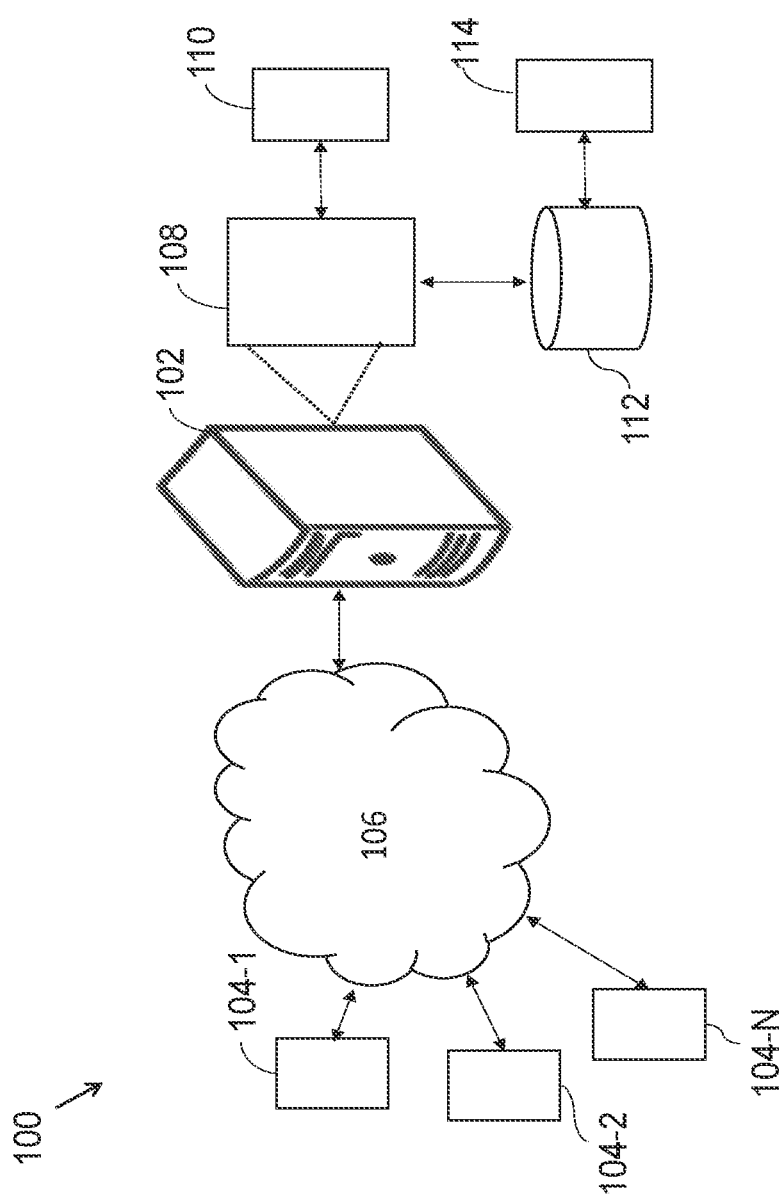
FIG. 1 illustrates an exemplary system for estimating urban metabolism based on remotely sensed data, according to an embodiment of the present disclosure.
Figure 2:
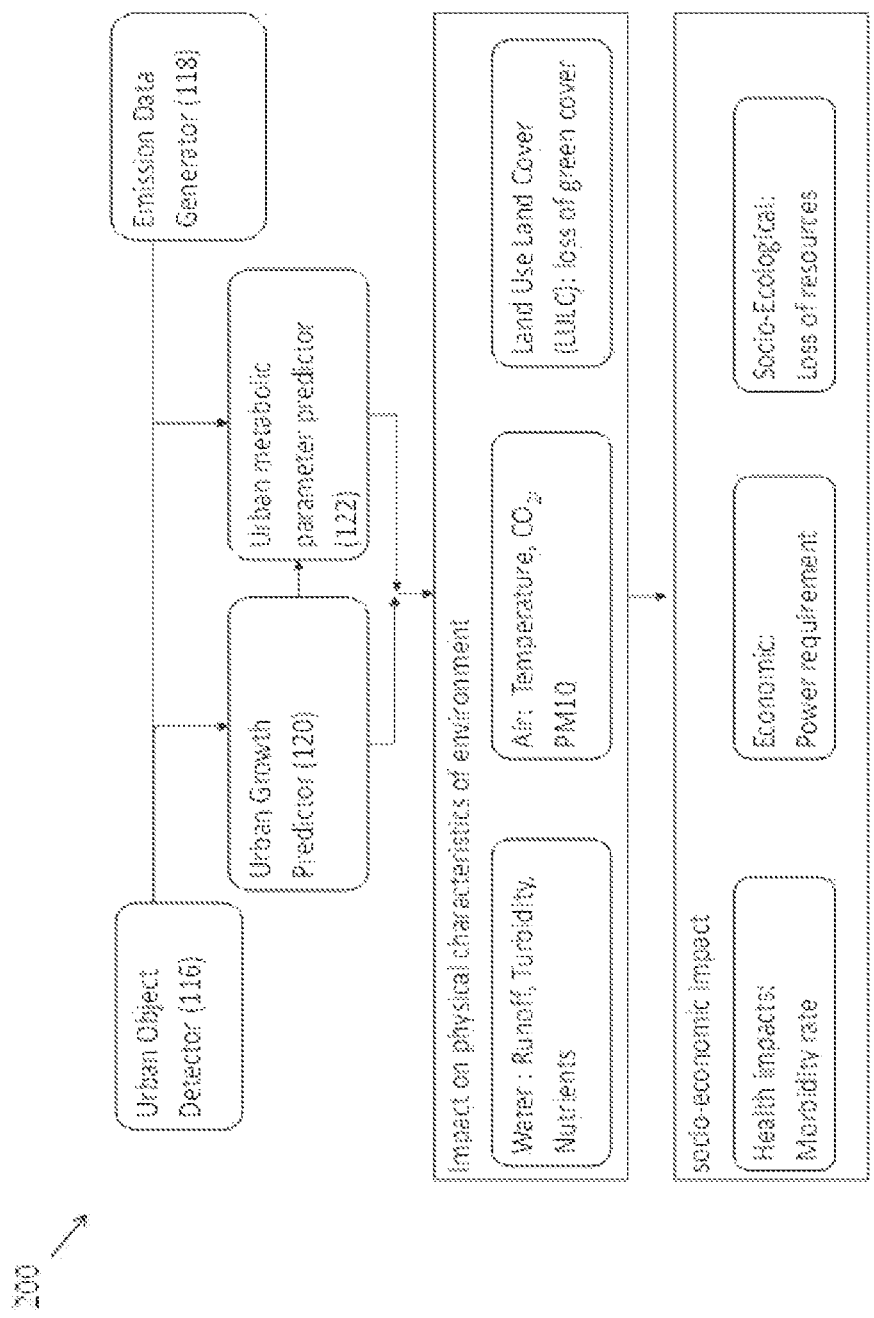
FIG. 2 is block diagram of the system to determine environment and socio-economic impact, according to an embodiment of the present disclosure.
Figure 3:
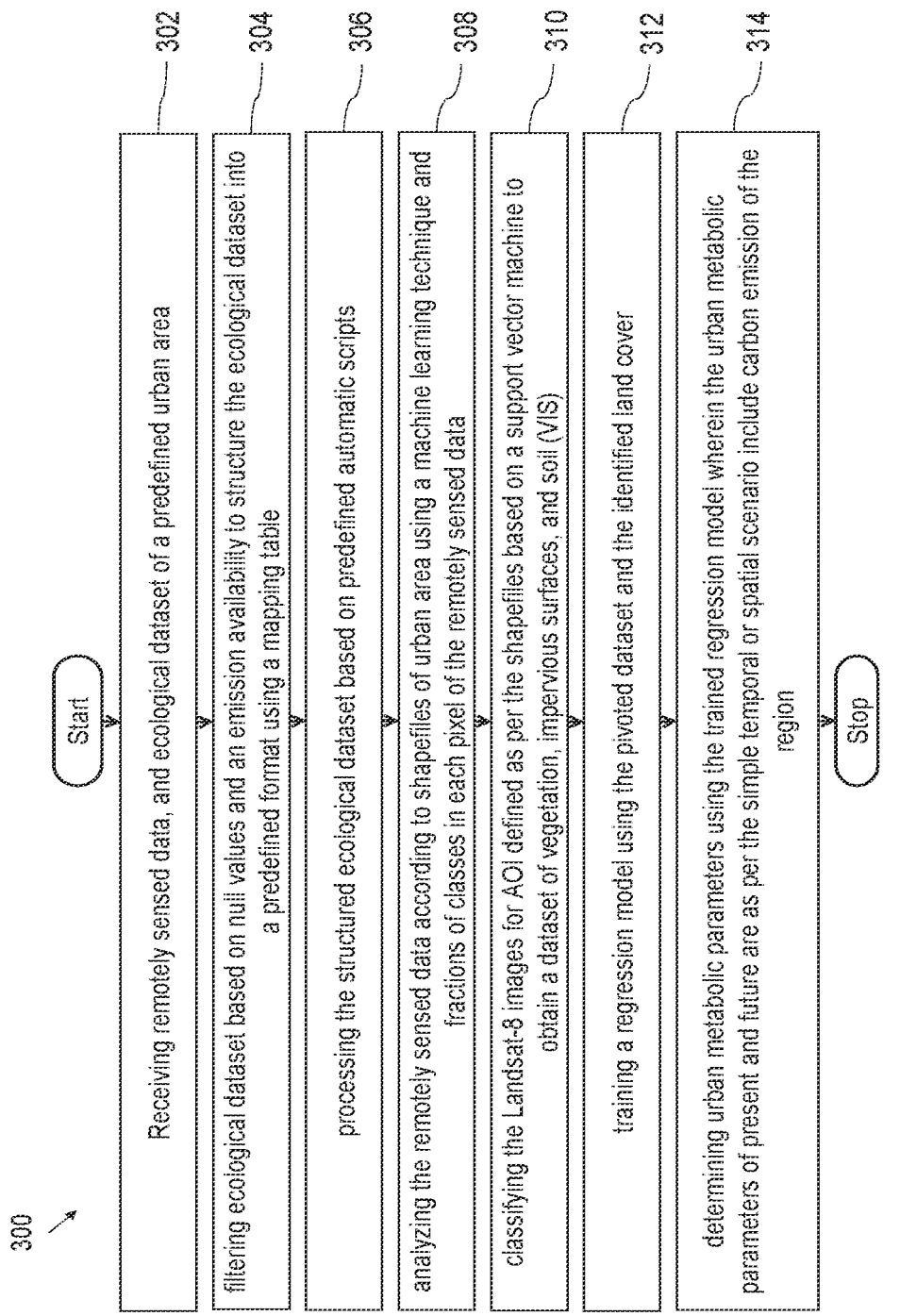
FIG. 3 is a flow diagram to illustrate a method for estimating urban metabolism based on remotely sensed data, in accordance with some embodiments of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 illustrates a block diagram of a system (100) for estimating urban metabolism based on remotely sensed data, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP). Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee, and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. Further, the system (100) comprises at least one memory (110) with a plurality of instructions, one or more databases (112), and one or more hardware processors (108) which are communicatively coupled with the at least one memory to execute a plurality of modules (114) therein. Further, the system comprises an urban object detector (116), an emission data generator (118), an urban growth predictor (120) and an urban metabolic parameter predictor (122). The components and functionalities of the system (100) are described further in detail.

In one embodiment, the system (100) is configured to receive the CDP dataset comprising of publicly available responses to various surveys such as corporate climate change disclosures, corporate water security disclosures, and disclosures from cities. It is to be noted that the CDP data of previous years is available along with a collection of supplementary datasets. Herein, the cities data contains urban disclosing, questionnaires, and responses. The system (100) is configured to pre-process the received CDP data to get individual responses in a pivot table.

In the preferred embodiment, to process an urban in a single image tile, the system (100) takes medium resolution Landsat-8 image as its spatial resolution, which may suffice for the urban lie inside the tile. Landsat-8 images are taken in a summer season to avoid the haze. Usually, boundary of cities has their random shape but initially the system (100) takes a predefined bounding box which encloses the urban boundary for each municipality which has reported emission.

Referring FIG. 2, a block diagram (200) of the system to determine environment and socio-economic impact according to an embodiment of the present disclosure. Herein, the land use land cover models of the urban object detector (116) of the system (100) are the fundamental methods for identifying different land (116) use and land cover regions in the given satellite imagery. The method takes any satellite image as input and identifies the land use and/or land cover in the given region. There are many supervised and unsupervised machine learning techniques available for the same. Any one of them can be used in the urban object detector (116). The importance of the urban object detector (116) in the given context is that it would use the model which provides correct proxy for the given metabolic parameter as per the models in an urban metabolic parameter predictor (122). It would be appreciated that the urban metabolic parameter predictor (122) is a supplementary in cases the metabolic parameter is not available for the entire urban or its spatial distribution is not available with required resolution. This is also useful in cases only a few local measurements, recorded by the measuring instrument, are available.

In another example, wherein the $CO_2$ concentration measurements are available only for a few total stations (say 20) in the urban. Either using optical satellite data or $CO_2$ measurements data (which is available at much coarse level a few km by km), we can create models to predict the $CO_2$ concentration models for the urban at much fine resolution say 30 m by 30 m. These are relations between remotely sensed data parameter and the metabolic parameter. It would require one model for each metabolic parameter and for each parameter different image feature/s are used.

The urban growth models of the urban metabolic parameter predictor (122) are key ingredients of the present system (100). Especially their form they take the impervious surfaces or different land covers and its spatial distribution as an input and predict the spatial distribution of the same over the urban. This cannot be achieved by simple timeseries based models. However, Markov models or cellular automata models are required. For example, VIS distribution over the urban is to be predicted considering detailed transition probabilities for VIS classes at coarse or fine level. Thus, given past land cover or land use data at required granularity, the model learns the transition probabilities of the changes and using such probabilities it predicts the given land cover for future. The land cover historical data is extracted using remotely senses data. Furthermore, other driver parameters of the growth are incorporated as well. This is helpful to play different growth scenarios for different socio-economic conditions.

In another example, wherein to estimate $CO_2$ emission of a city, firstly the emission data generator (118) is trained with one or more features of the city which may cause $CO_2$ emission on a particular day. It would be appreciated that herein Landsat data is used which has 30 m spatial resolution and 16 days revisit period. The CDP data available for the city and its emission is used to showcase present system. Secondly, impervious surfaces are extracted from the Landsat data using any supervised classification technique or unsupervised technique. Similarly, hard classification and soft classification can be used too. It is to be noted that the impervious surfaces are one of the proxies for $CO_2$ emissions. Further, other proxy/proxies such as economic zones, number of buildings, type of buildings, size, and road length at finer resolution can be used. The same proxies may or may not be useful for other parameters, for example, solid waste would not depend upon the road length. The impervious surfaces in general are a good proxy for solid waste.

In the preferred embodiment, the urban metabolic parameter predictor (122) of the system (100) takes image features as an input to predict a required urban metabolic parameter. For example, given impervious surfaces, runoff from the area is predicted. The features such as impervious surface is extracted using satellite imagery. In some conditions the factors that are directly corelated with the metabolic parameter may not be observable. In such condition the proxy feature from the image is extracted and is corelated with the metabolic parameter. For example, fossil fuel burned in the urban is corelated with the impervious surfaces. Many such proxies are used. This is achieved by multiple means. Based on the first principal emission rates can be applied to the extracted image feature from the image, for example, vegetation emits x amount of $CO_2$ annually. Other method is to develop correlation between the image feature or urban feature based on the historical data. This is useful when the emission factors are not available or not easy to calculate but the quantities from inventory methods are available. For example, emission because of fossil fuel burning including cooking, transportation etc.

In yet another example, wherein goal is to estimate annual carbon dioxide emission from the urban area and predict it for future as well. Firstly, a Landsat data, which has 30 m spatial resolution and 16 days revisit period, is used for estimating carbon dioxide emission. Impervious surfaces are extracted from the Landsat data based on a predefined classification technique. Secondly, a relation between the quantity of impervious surfaces and the carbon dioxide emission is developed based on a regression techniques. In addition to impervious surfaces, other variables can be added for improving the accuracy.

In another embodiment, the urban growth predictor (120) of the system (100) are predicting impervious surface areas are used. Based on the driver parameters and other similar such conditions, different scenarios for spatial distribution of impervious surfaces are generated. Based on that and the model developed for impervious surfaces and $CO_2$ emissions, the emission for the urban in future are predicted. The urban growth models can provide specific types as well instead of higher-level output such as impervious surface. Though we use impervious surfaces as one of the key indicators for working out quantities of metabolic parameters, as described earlier, any such feature that can be extracted from the image can be used for entire process chain. It is also to be noted that the same proxy may or may not be useful for all metabolic activities. Impervious surfaces are most generic and broad level urban feature that can be easily extracted from the image. Many of the metabolic parameters are related to the impervious surfaces and there is physical basis to it. Similarly, other metabolic parameters can be particulate matter, $SO_x$, $NO_x$, solid waste, wastewater and so on.

Referring FIG. 3, to illustrate a processor-implemented method (300) estimating urban metabolism based on remotely sensed data.

Initially, at the step (302), receiving, via an input/output interface, a plurality of benign uniform resource locators (URLs) of a business sector from a user, wherein each of the plurality of benign domains include a benign domain.

At the next step (304), filtering the received predefined ecological dataset based on null values and an emission availability to structure the ecological dataset into a predefined format of a mapping table.

At the next step (306), processing the structured ecological dataset based on one or more predefined automatic scripts, wherein the one or more predefined automatic scripts for querying questions and answers of interest from a survey, pivoting the structured ecological dataset, and then further scoping of the ecological dataset as per scope of emission availability and at least one ecological parameter of interest.

At the next step (308), analyzing the received remotely sensed data according to shapefiles of the predefined urban area using a machine learning technique and one or more fractions of classes in each pixel of the remotely sensed data.

At the next step (310), classifying the one or more Landsat-8 images and shapefiles based on a support vector machine to obtain a dataset of vegetation, impervious surfaces, and soil, wherein a fully constrained least square technique is used for linear spectral mixing of the dataset of vegetation, impervious surfaces, and soil (VIS). With 30 m resolution data, many a times, a pixel occupy more than one urban objects (there would be many such pixels in the image). for example, half of the pixel would be occupied by grass and half by concrete. In such cases if hard classification is used, it will estimate the built-up area or vegetation area incorrectly. Calculating correct class areas is important in this exercise. Hence unmixing by variety of means is performed. There are further problems in unmixing which are required to be rectified. For example, soil and built-up confusion. That arises because of the spectral similarity of the two classes/urban objects.

At the next step (312), training a regression model using the pivoted dataset and the identified land cover.

At the last step (314), determining one or more urban metabolic parameters using the trained regression model, wherein the one or more urban metabolic parameters of present and future as per the simple temporal or spatial scenario include carbon emission of the predefined region.

In yet another embodiment, the method (300) comprising adjusting or correcting the soil and built-up fractions in the abundances as a post processing step using a neighborhood or an adjacency rules with one or more fuzzy variables that is high low probability is interpreted using membership function of a fuzzy variable.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of urban metabolism with respect to water demand and carbon dioxide emissions, most of the discussion is based on the reported data by the urban areas. The embodiments herein provide a method and system for estimating urban metabolism based on remotely sensed data. The system is configured to develop a model for identifying correct features from image or proxy features from image and then develop/use relation between the image feature or proxy feature from the image with the urban metabolic parameter. Further, the system develops an urban growth model which predicts spatial extent of the given proxy features. The urban growth scenario for each such conditions is different. By changing conditions of the model, different growth scenarios are played out. For each scenario, at least one urban metabolic parameter is predicted by taking output of the urban growth predictor.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising steps of:
receiving, via an input/output interface, remotely sensed data, and a predefined ecological dataset of a predefined urban area, wherein the remotely sensed data includes multispectral data, hyperspectral data, radar data, one or more Landsat-8 images and shapefiles of the predefined urban area;
filtering, via one or more hardware processors, the received predefined ecological dataset based on null values and an emission availability to structure into a predefined format of a mapping table;
processing, via the one or more hardware processors, the structured ecological dataset based on one or more predefined automatic scripts;
analyzing, via the one or more hardware processors, the received remotely sensed data according to the shapefiles of the predefined urban area using a machine learning technique and one or more fractions of classes in each pixel of the remotely sensed data;
classifying, via the one or more hardware processors, the one or more Landsat-8 images based on a support vector machine to obtain a dataset of vegetation, impervious surfaces, and soil;
training, via the one or more hardware processors, a regression model using the pivoted dataset and a land cover; and
determining, via the one or more hardware processors, one or more urban metabolic parameters using the trained regression model, wherein the one or more urban metabolic parameters of present and future are as per a simple temporal or spatial scenario including carbon emission of the predefined region.

2. The processor-implemented method of claim 1, wherein the one or more predefined automatic scripts for querying interest through a survey, pivoting the structured ecological dataset, and scoping of the ecological dataset as per scope of emission availability and at least one ecological parameter of interest.

3. The processor-implemented method of claim 1, wherein a fully constrained least square technique is used for linear spectral mixing of the dataset of vegetation, impervious surfaces, and soil (VIS).

4. The processor-implemented method of claim 1, wherein training of the machine learning technique via one or more fractions or abundances of VIS in an input image pixel by feeding a Normalized Difference Vegetation Index (NDVI), a Soil Adjusted Vegetation Index (SAVI) and a built-up indices to a neural network.

5. The processor-implemented method of claim 1, further comprising adjusting the soil and built-up fractions in the abundances as a post processing step using a neighborhood pixel labels or an adjacency rules with one or more fuzzy variables that is high and low probability is interpreted using a membership function of at least one of one or more fuzzy variables.

6. A system comprising:
an input/output interface to receive remotely sensed data and a predefined ecological dataset of a predefined urban area, wherein the remotely sensed data includes multispectral data, hyperspectral data, radar data, one or more Landsat-8 images and shapefiles of the predefined urban area:
one or more hardware processors;
a memory in communication with the one or more hardware processors, wherein the one or more hardware processors are configured to execute programmed instructions stored in the memory, to:
filter the received predefined ecological dataset based on null values and an emission availability to structure the ecological dataset into a predefined format of a mapping table;
process the structured ecological dataset based on one or more predefined automatic scripts;
analyze the received remotely sensed data according to the shapefiles of the predefined urban area using a machine learning technique and one or more fractions of classes in each pixel of the remotely sensed data;
classify the one or more Landsat-8 images based on a support vector machine to obtain a dataset of vegetation, impervious surfaces, and soil;

train a regression model using the pivoted dataset and a land cover, and determine one or more urban metabolic parameters using the trained regression model, wherein the one or more urban metabolic parameters of present and future are as per a simple temporal or spatial scenario including carbon emission of the predefined region.

7. A non-transitory computer readable medium storing one or more instructions which when executed by one or more processors on a system, cause the one or more processors to perform method comprising:

receiving, via an input/output interface, remotely sensed data, and a predefined ecological dataset of a predefined urban area, wherein the remotely sensed data includes multispectral data, hyperspectral data, radar data, one or more Landsat-8 images and shapefiles of the predefined urban area;

filtering, via a one or more hardware processors, the received predefined ecological dataset based on null values and an emission availability to structure the ecological dataset into a predefined format of a mapping table;

processing, via the one or more hardware processors, the structured ecological dataset based on one or more predefined automatic scripts;

analyzing, via the one or more hardware processors, the received remotely sensed data according to the shapefiles of the predefined urban area using a machine learning technique and one or more fractions of classes in each pixel of the remotely sensed data;

classifying, via the one or more hardware processors, the one or more Landsat-8 images based on a support vector machine to obtain a dataset of vegetation, impervious surfaces, and soil;

training, via the one or more hardware processors, a regression model using the pivoted dataset and a land cover; and determining, via the one or more hardware processors, one or more urban metabolic parameters using the trained regression model, wherein the one or more urban metabolic parameters of present and future are as per a simple temporal or spatial scenario including carbon emission of the predefined region.

* * * * *